G. W. YOUNGS.
CATTLE GUARD.
APPLICATION FILED FEB. 15, 1909.
936,974.
Patented Oct. 12, 1909.
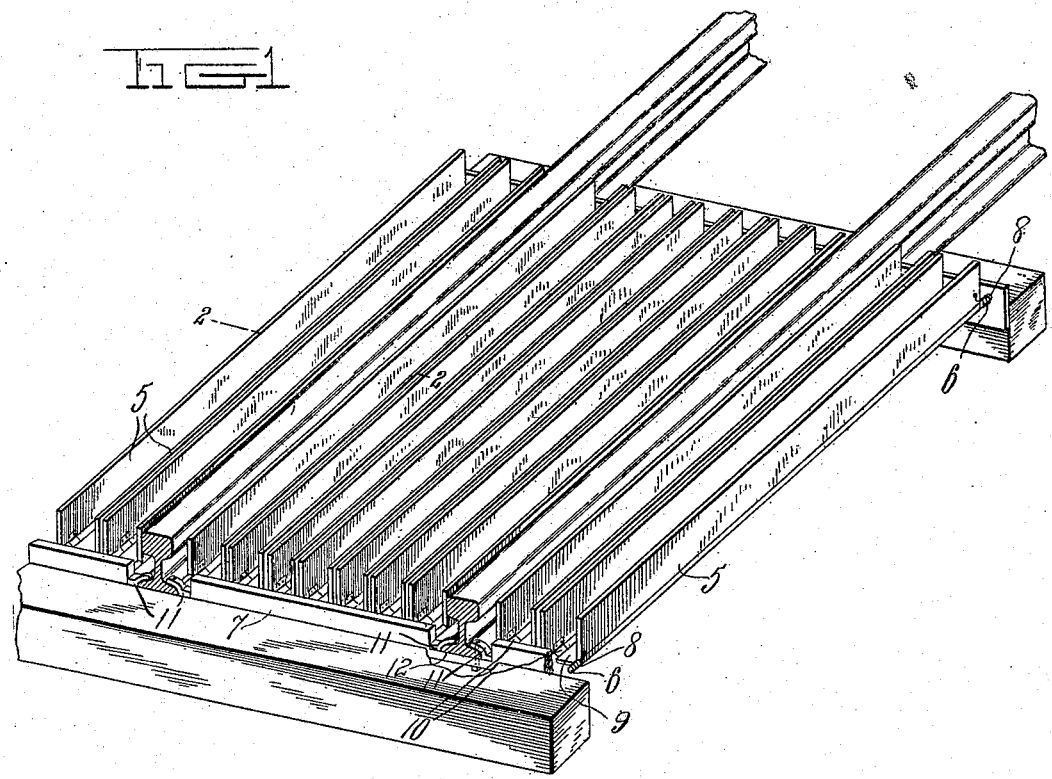
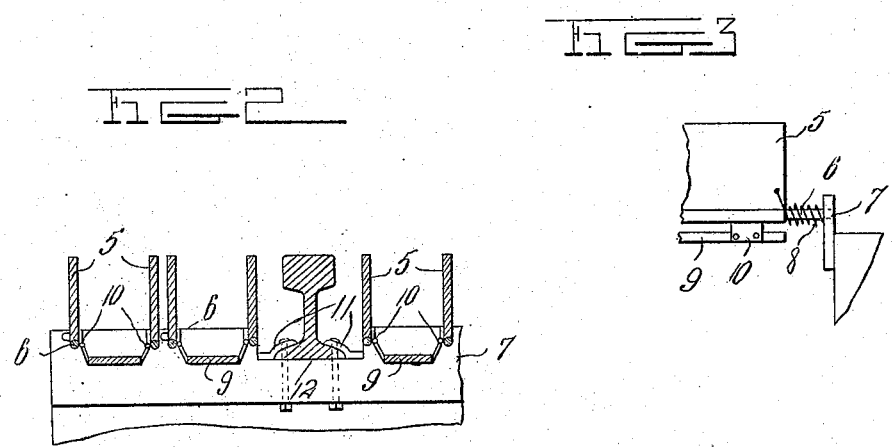
Witnesses
J. H. Crawford
B. E. Cooksey.
Inventor
George W. Youngs,
By
Attorneys

UNITED STATES PATENT OFFICE.

GEORGE WILLIAM YOUNGS, OF GREENWOOD, WISCONSIN.

CATTLE-GUARD.

936,974.  Specification of Letters Patent.  Patented Oct. 12, 1909.

Application filed February 15, 1909. Serial No. 477,907.

*To all whom it may concern:*

Be it known that I, GEORGE WILLIAM YOUNGS, a citizen of the United States, residing at Greenwood, in the county of Clark, State of Wisconsin, have invented certain new and useful Improvements in Cattle-Guards; and I do hereby declare the following to be a full, clear, and exact description of the invention, such as will enable others skilled in the art to which it appertains to make and use the same.

The present invention relates to improvements in guards for excluding cattle from railway inclosures, and it resides, primarily, in the provision of an extremely simple, inexpensive and efficient device of this nature comprising a series of independently operated members arranged parallel with the track rails, and in juxtaposition to each other, each member consisting of a pair of jaws normally held in spaced parallel relation to each other, and a depressible actuating member interposed therebetween and adapted to rock or swing the jaws inwardly or toward each other.

The preferred embodiment of the invention is illustrated in the accompanying drawings, in which corresponding parts are designated by the same reference numerals throughout the several views.

Of the said drawings, Figure 1 is a perspective view of the improved guard. Fig. 2 is a section taken transversely therethrough on the line 2—2. Fig. 3 is a fragmental detail view of one of the jaws illustrating the manner in which the spring is connected therewith.

As above stated, the guard comprises a series of parallel members arranged in juxtaposition to each other and parallel with the track rails, the members being located both between the rails and at the outer sides thereof. Each member, as shown, consists essentially of a pair of flat metal plates 5, which are secured in any preferred manner at their lower longitudinal edges to rock-rods 6, whose length slightly exceeds that of the plates. The projecting ends of these rods fit in bearing openings formed in a strap 7 disposed transversely of the rails and fastened thereto in any suitable manner. The plates above referred to are thus capable of a swinging or rocking movement, as will be apparent, but said plates, however, are normally held in vertical position by means of expansible springs 8, whose ends are secured thereto and to the strap 7. These plates form the jaws originally referred to.

The movement of the jaws is effected by means of depressible beams 9, which are disposed in the spaces between the jaws and are connected with the latter by means of hinges 10. These beams, however, are constructed independently of the jaws and have no other connection therewith than the above mentioned hinges, the arrangement being such that when an animal steps upon any one of the beams, the jaws connected therewith will be caused to move inwardly toward each other, until the upper longitudinal edges thereof grip the leg of the animal, such gripping action continuing as long as pressure is exerted by the animal upon the beam. As soon as this pressure is relieved by the animal raising its leg, the jaws will return to their normal position under the action of the springs.

What is claimed is:—

1. In a cattle guard, the combination of a pair of rocking jaws arranged in spaced parallel relation to each other, and a depressible member interposed between the jaws and connected therewith for swinging said jaws inwardly toward each other, said depressible member being constantly disposed in a horizontal position.

2. In a cattle guard, the combination of a pair of rocking jaws arranged in spaced parallel relation to each other, means for normally holding the jaws in vertical position; and a depressible member interposed between the jaws and connected therewith for swinging said jaws toward each other, said depressible member being constantly disposed in a horizontal position.

3. In a cattle guard, the combination of a pair of rocking jaws arranged in spaced parallel relation to each other; means for normally holding the jaws in vertical position and a depressible beam disposed longitudinally in the space between the jaws and connected with said jaws for swinging same inwardly toward each other, said depressible member being constantly disposed in a horizontal position transversely.

4. In a cattle guard, the combination of a pair of rocking jaws arranged in spaced relation to each other, means for normally holding the said jaws in vertical position, and a depressible member for swinging said jaws inwardly toward each other, said member being interposed between the jaws and connected therewith, and adapted to be constantly maintained in a horizontal position transversely during its movement.

In testimony whereof, I affix my signature, in presence of two witnesses.

GEORGE WILLIAM YOUNGS.

Witnesses:
J. A. L. LARSON,
E. J. ASCHENBRENER.